US005606949A

United States Patent [19]

Ohara et al.

[11] Patent Number: 5,606,949

[45] Date of Patent: Mar. 4, 1997

[54] THROTTLE VALVE DEVICE OF V-TYPE ENGINE

[75] Inventors: Toshiki Ohara, Fujisawa; Isaya Matsuo, Yokohama, both of Japan

[73] Assignee: Nissan Motor Co., Ltd., Yokohama, Japan

[21] Appl. No.: 309,447

[22] Filed: Sep. 20, 1994

[30] Foreign Application Priority Data

Sep. 29, 1993 [JP] Japan .................................... 5-242318

[51] Int. Cl.[6] .............................. F02D 9/02; B60K 28/16

[52] U.S. Cl. ............................................................ 123/396

[58] Field of Search .................................... 123/396, 397; 180/197

[56] References Cited

U.S. PATENT DOCUMENTS

| | | | |
|---|---|---|---|
| 5,141,070 | 8/1992 | Hickmann et al. | 123/396 |
| 5,265,572 | 11/1993 | Kadomukai et al. | 123/396 |
| 5,297,521 | 3/1994 | Sasaki et al. | 123/396 |
| 5,419,293 | 5/1995 | Nagai | 123/396 |
| 5,435,284 | 7/1995 | Shimizu et al. | 123/396 |
| 5,447,133 | 9/1995 | Kamio et al. | 123/396 |
| 5,462,026 | 10/1995 | Kumagai | 123/396 |

FOREIGN PATENT DOCUMENTS 3-50341 3/1991 Japan .

*Primary Examiner*—David A. Okonsky
*Attorney, Agent, or Firm*—Foley & Lardner

[57] ABSTRACT

A throttle valve device of a V-type internal combustion engine, comprising a mechanism for operating a throttle valve independently of an acceleration operation by an acceleration pedal. The mechanism includes a DC motor which is drivingly connected to the throttle shaft to control a slip ratio of a road wheel. The DC motor is located below a throttle chamber of the throttle valve device and arranged such that a drive shaft thereof is parallel with and opposite to a throttle shaft on which the throttle valve is mounted, thereby suppressing the width of the throttle valve device in the direction of the throttle shaft.

14 Claims, 4 Drawing Sheets

THROTTLE VALVE DEVICE OF V-TYPE ENGINE

BACKGROUND OF THE INVENTION

1. Field of the Invention

This invention relates to improvements in a throttle valve device of a V-type internal combustion engine, and more particularly to a throttle valve device including a mechanism for operating a throttle valve in relation to an acceleration operation and another mechanism for operating the throttle valve independently of the acceleration operation.

2. Description of the Prior Art

A throttle valve device has been proposed to be provided with a mechanism for operating a throttle valve in relation to an acceleration operation and another mechanism for operating the throttle valve independently of the acceleration operation, as disclosed in Japanese Patent Provisional Publication No. 3-50341. The throttle valve device includes a throttle shaft on which a throttle valve or plate is fixedly mounted to rotate around the axis of the shaft. One end section of the throttle shaft is provided with an acceleration drum to which an end of an acceleration wire is engaged. The other end section of the throttle shaft is provided with a gear mechanism. A step motor is provided on the opposite side of the gear mechanism with respect to throttle valve so that the rotational drive force of the step motor is transmitted through the gear mechanism to the throttle shaft.

With such an arrangement, the throttle valve is operated to open or close in relation to the acceleration operation through the acceleration drum, while it can be additionally operated to open or close independently of the acceleration operation, for example, by electronically controlling the opening degree of the throttle valve to control a slip ratio of a road wheel at a suitable value thus accomplishing a so-called traction control.

However, drawbacks have been encountered in the above conventional arrangement particularly in a case that the throttle valve device is installed to a V-type engine such that a throttle chamber is located to extend along the rows of engine cylinders and between banks in plan. That is, in the conventional throttle valve device, the step motor projects far from the end section of the throttle shaft, and therefore the conventional throttle valve device become unavoidably wider in the axial direction of the throttle shaft. As a result, the throttle valve device interferes with the cylinder heads, rocker covers or/and the like, so that the location of the throttle chamber is required to be shifted.

Here, the shift of the throttle chamber to an upward position is restricted by an engine hood. In general, the height of the engine hood decreases in a direction toward the front of the vehicle, and therefore the allowable height of the throttle chamber seems to increase by locating the throttle chamber at the rear side of the engine compartment and between the banks. However, in a case that the width of the throttle valve device increases owing to the above-identified disposition manner of the motor, shifting the throttle chamber to a much higher position is required thereby to further raise the height of the engine hood as compared with the case of a throttle valve device providing no mechanism for operating the throttle valve by a motor.

Additionally, it may be proposed to shift the position of the throttle chamber toward the ends of the banks so as to locate at least the motor out of the space defined between the banks in order to prevent the throttle valve device from interference with the cylinder heads, rocker covers and/or the like. However, in this case, the length of the engine in the direction of the cylinder rows will be unavoidably enlarged thereby requiring an enlargement of the engine compartment.

SUMMARY OF THE INVENTION

It is an object of the present invention to provide an improved throttle valve device of a V-type internal combustion engine, which can effectively overcome drawbacks encountered in conventional throttle valve devices to be used in a V-type engine.

Another object of the present invention is to provide an improved throttle valve device of a V-type internal combustion engine, in which a throttle chamber can be located to extend along the rows of engine cylinders and between the banks in plan without increasing the height of an engine hood and enlarging an engine compartment, even though the throttle valve device is provided with a valve operating mechanism (including a motor) for operating a throttle valve independently of an acceleration operation.

A further object of the present invention is to provide an improved throttle valve device of a V-type internal combustion engine, wherein the width of the throttle valve device in the direction of a throttle shaft is largely decreased by locating a motor in such a manner that the axis of the motor is parallel and opposite to that of the throttle shaft.

A throttle valve device of the present invention is of a V-type internal combustion engine and is formed with a throttle chamber through which intake air is introduced into engine cylinders of the engine. The throttle chamber has an axis generally parallel with rows of the engine cylinders and is located between banks of the engine in plan. A throttle valve is rotatably disposed in the throttle chamber. A throttle shaft is provided such that the throttle valve is mounted thereon. A first throttle valve operating mechanism is connected to a first end section of the throttle shaft to rotate the throttle shaft in relation to an acceleration operation. A second throttle valve operating mechanism is provided to rotate the throttle shaft independently of the first throttle valve operating mechanism. The second throttle valve operating mechanism includes an electric motor having a rotatable drive shaft. The drive shaft is separate and drivingly connected with a second end section of the throttle shaft. The drive shaft extends parallel with and generally opposite to the throttle shaft. The motor is located below the throttle chamber and between the banks of the engine in plan.

Accordingly, the motor is located such that its axis is parallel with and opposite to the throttle shaft, and therefore the throttle valve device can be effectively prevented from enlargement in width in the direction of the throttle shaft though the motor is connected to the throttle shaft. This avoids interference of the throttle valve device with the cylinder heads, rocker covers and/or the like. Additionally, since the motor is located below the throttle chamber, the throttle valve device can be prevented from enlargement in its whole height, thereby preventing the height of the engine hood from being raised.

DETAILED DESCRIPTION OF THE INVENTION

Figure 1:
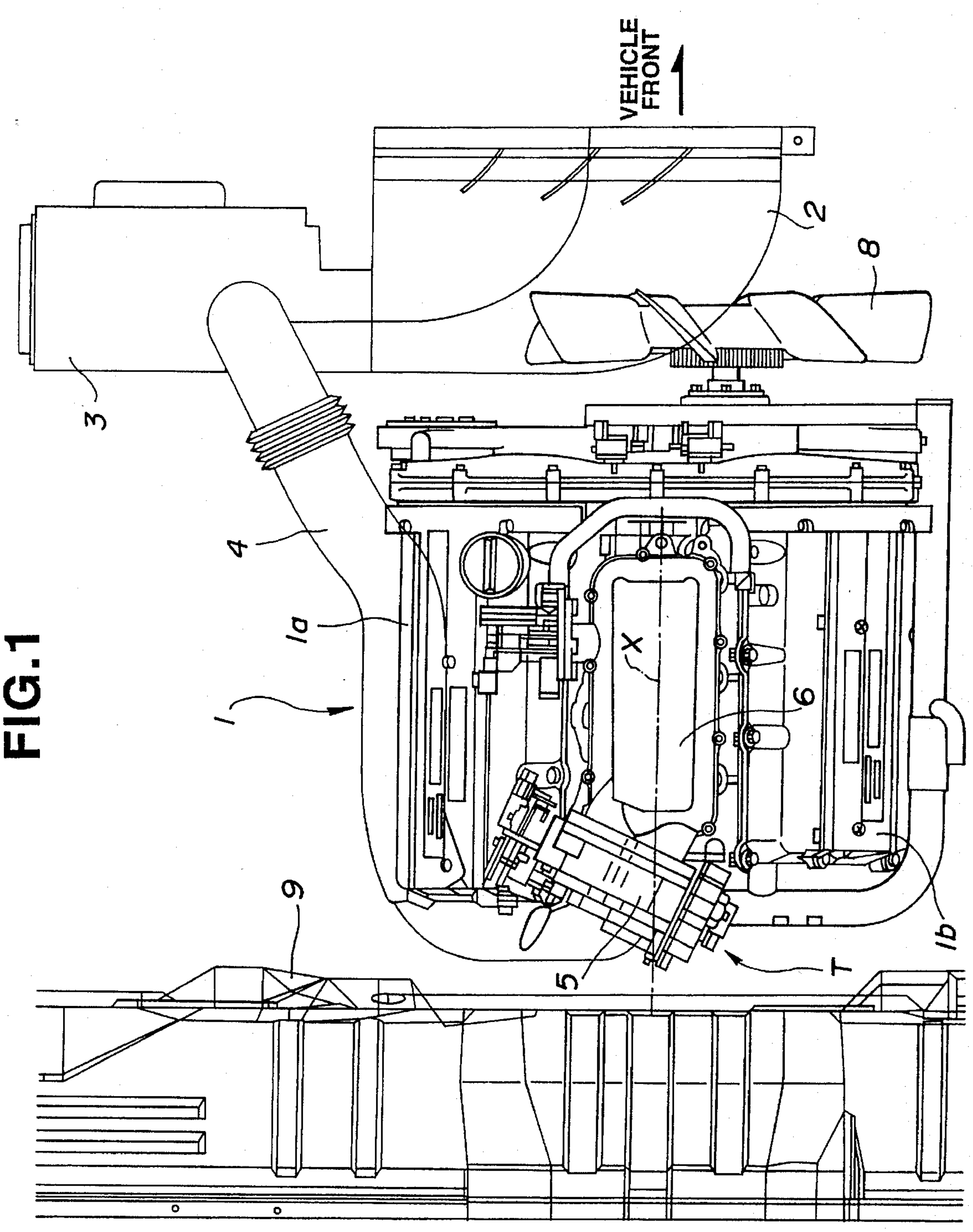
FIG. 1 is a top plan view of a V-type internal combustion engine including an embodiment of a throttle valve device of the present invention, disposed in an engine compartment of an automotive vehicle.

Referring now to FIG. 1, an embodiment of a throttle valve device of a V-type internal combustion engine 1, according to the present invention is illustrated by the reference character T. The engine 1 is of an automotive vehicle and mounted at the front of a vehicle body (not shown) and located longitudinally relative to the vehicle body (not shown). In other words, the rows of aligned engine cylinders (not shown) are parallel with the longitudinal direction of the vehicle body. The engine 1 includes two banks 1*a*, 1*b*, with each bank having a plurality of the aligned engine cylinders. An air induction duct 2 is provided in the vicinity and in front of the engine 1 to induct atmospheric air. Air inducted from the air induction duct 2 is introduced through an air filter 3 and an air introduction duct 4 to a location behind the engine 1.

A throttle chamber device 5 forming part of the throttle valve device T is formed with a throttle chamber 5*a* which is in communication with the air introduction duct 4. The throttle chamber 5*a* is further in communication with an intake air collector 6 and an air intake manifold 7 which are in turn in communication with the engine cylinders. The throttle chamber 5*a* extends generally along the row of the aligned engine cylinders and located above and at a rear side of the engine 1. Accordingly, intake air introduced through the air introduction duct 4 passes through the throttle chamber 5*a* and is supplied through the intake air collector 6 and the intake manifold 7 into the engine cylinders. In FIG. 1, the reference numerals 8 and 9 denote a cooling fan and a dashboard panel, respectively.

The throttle chamber device 5 is located at the rear side of the engine 1 for the following reasons: That is, since the throttle chamber device 5 is disposed above the engine 1, it is preferable to be located below the rear side of an engine hood (not shown) defining an engine compartment in which the engine 10 is disposed, the engine hood rear side being relatively high in level. Additionally, an air introduction passage (no numeral) including the air introduction duct 4, upstream of the throttle chamber 5*a*, is preferably made as long as possible in order to shift the peak of a so-called resonance supercharging effect to a low engine speed side.

Figure 2:
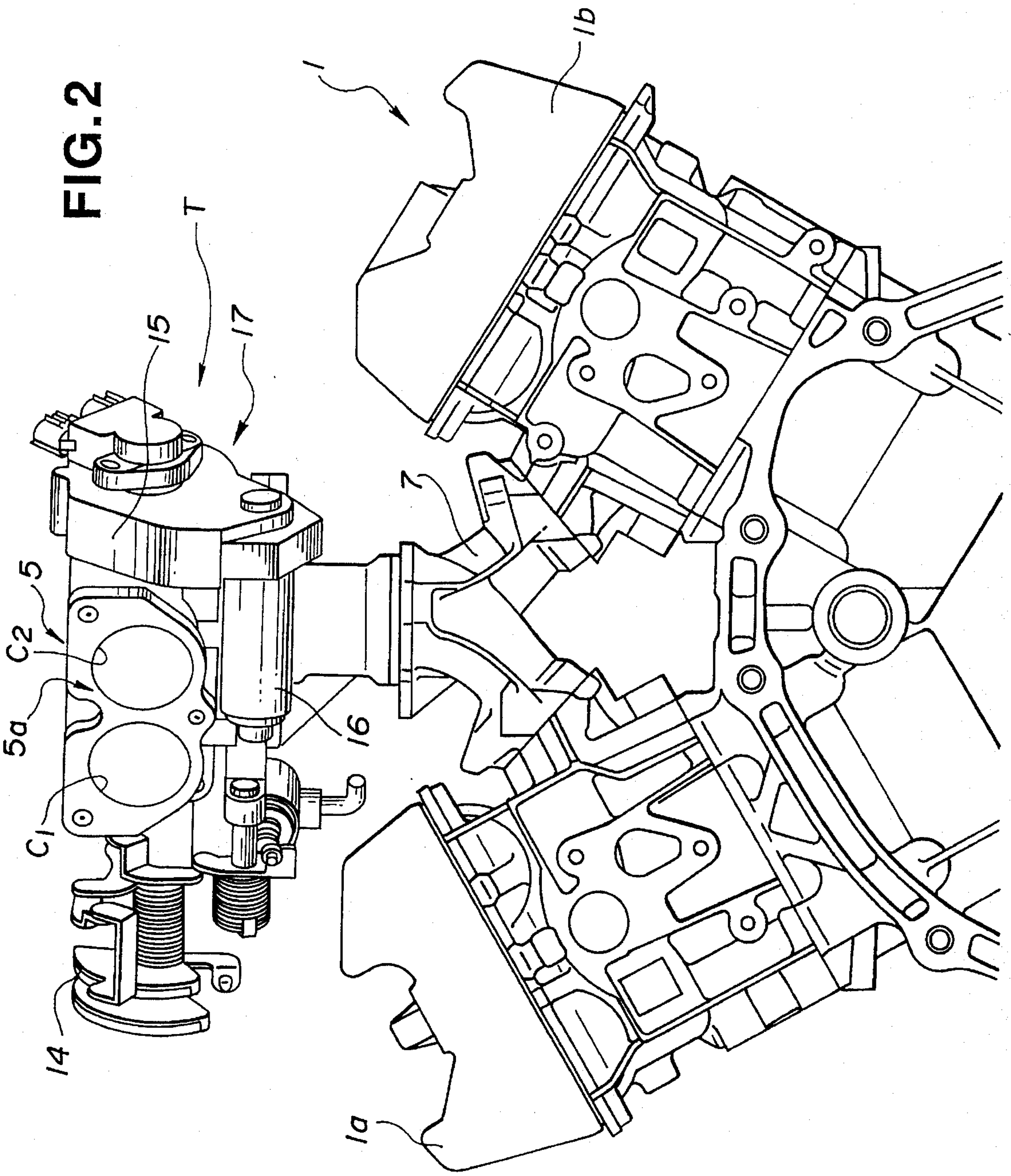
FIG. 2 is a side elevation of the engine of FIG. 1.

As shown in FIG. 2 which is the figure as viewed from the rear side of the engine 1 or the vehicle body, the throttle chamber 5*a* includes two cylindrical chambers or barrels C1, C2 which are arranged parallel with each other and have an axis (not shown) generally parallel with the axis X of the engine 1. Two butterfly type throttle valves or plates 11, 11 (clearly shown in FIG. 3) are rotatably disposed respectively in the two chambers C1, C2. Thus, the throttle chamber 5*a* is of the two-barrel type. Accordingly, intake air flows through the chambers C1, C2 and is introduced into the intake air collector 6. Then, intake air is sucked into the respective engine cylinders through the intake manifold 7 which is connected with the lower part of the intake air collector 6.

The throttle valves 11*a*, 11*b* are operated to open or close in relation to an acceleration operation made by an acceleration pedal (not shown) disposed in a passenger compartment (not shown). Additionally, the throttle valves 11*a*, 11*b* are arranged to open or close under the action of an electric motor (DC motor) 16. This, for example, accomplishes a so-called traction control to maintain a slip ratio of a road wheel (not shown) at a suitable value, under the action of an electronical control of the electric motor 16. In other words, the electric motor 16 is controlled in response to the slip ratio as a vehicle operating parameter.

Figure 3:
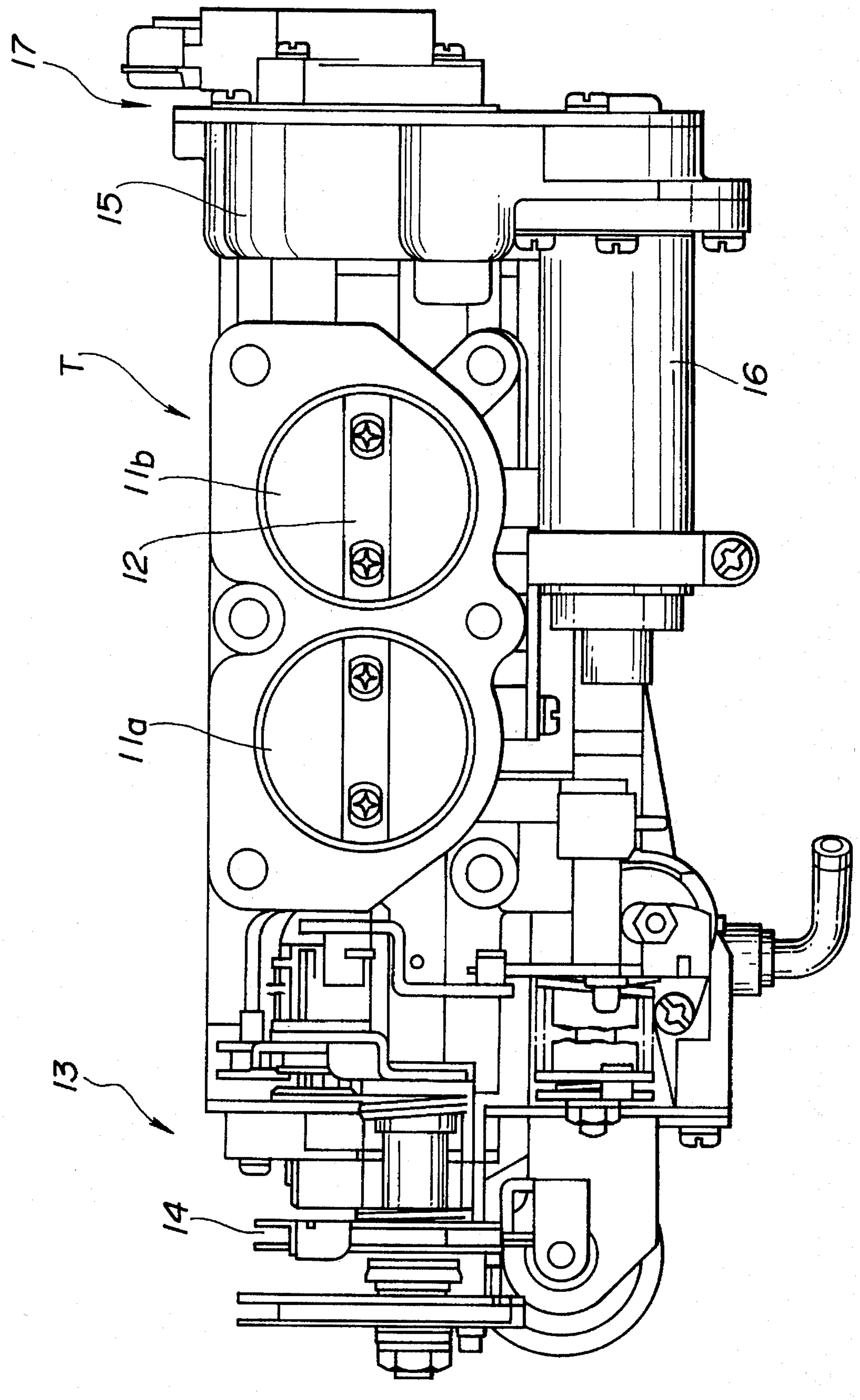
FIG. 3 is a front elevation of the throttle valve device of FIG. 1.

Next, a mechanism for operating the throttle valves 11*a*, 11*b* will be discussed in detail with reference to FIGS. 3 and 4.

The throttle valves 11*a*, 11*b* are fixedly supported or mounted on a throttle shaft 12 to be rotatable with the throttle shaft 12. The axis of the throttle shaft 12 is generally perpendicular to the axis of each cylindrical chamber C1, C2. One end section of the throttle shaft 12 is provided with an acceleration drum mechanism 13 which operates to open or close the throttle valves 11, 11 in relation to the acceleration operation of the acceleration pedal. The acceleration drum mechanism 13 includes an acceleration drum (throttle drum) 14 to which one end of an acceleration wire (not shown) is engaged. The other end of the acceleration wire is connected to the acceleration pedal. The acceleration drum mechanism 13 is a known mechanism which is arranged to rotate the throttle shaft 12 to open the throttle valves 11*a*, 11*b* against the biasing force (acting in a direction to close the throttle valves) of a so-called lost motion spring (not shown) by pulling the acceleration wire under action of the acceleration pedal.

Figure 4:
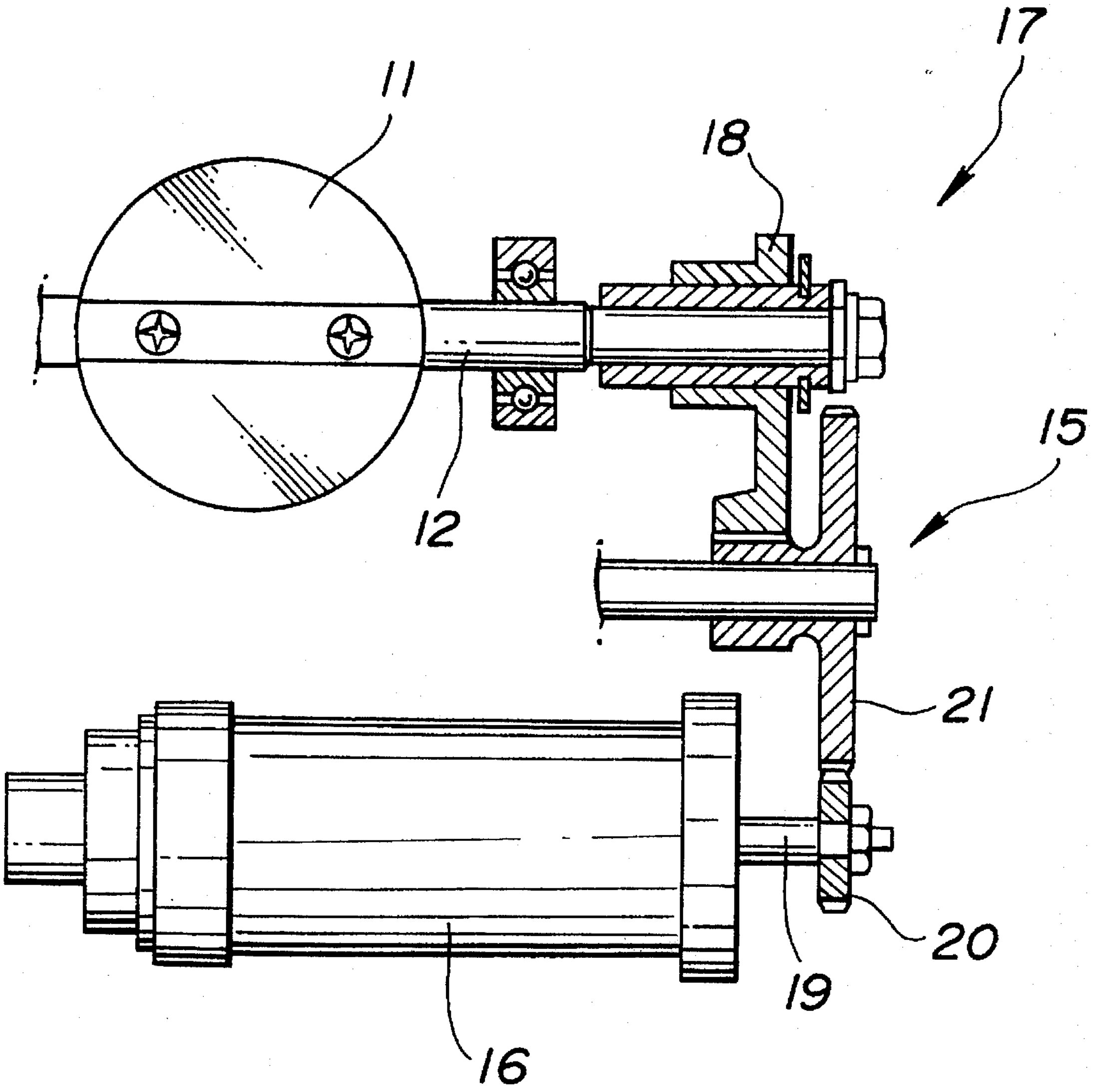
FIG. 4 is a fragmentary front view, partly in section, of an essential part of the throttle valve device of FIG. 1.

As clearly shown in FIG. 4, the other end section of the throttle shaft 12 is provided with a throttle actuator mechanism 17 including a driving device having a gear box (gear mechanism) 15 and the DC motor 16. In the throttle actuator mechanism 17, a gear 18 fixedly mounted on the tip end section of the throttle shaft 12 is indirectly engaged with a gear 20 fixedly mounted on the tip end section of a drive shaft 19 of the DC motor 16 through a gear 21, so that the gear 18 is rotatable in relation to the rotation of the gear 20. As a result, a throttle opening degree (the opening degree of the throttle valves 11*a*, 11*b*) is controlled independently of the acceleration operation of the acceleration pedal, under the drive of the DC motor 16.

The drive shaft 19 of the DC motor 16 and the throttle shaft 12 are located parallel with each other and extend in the same direction so that they are opposite to each other, as best shown in FIG. 4. In other words, the DC motor drive shaft 19 and the throttle shaft 12 are connected with each other through the gear 18, 20, 21, constituting a generally U-shaped structure. The DC motor 16 is disposed at a location above and between the banks 1*a*, 1*b* of the engine 1. In other words, the drive shaft 19 of the DC motor extends from the side of the acceleration drum 14 to the side of the gear box 15 and parallel with the throttle shaft 12. When the DC motor 16 is actuated to rotate the drive shaft 19 around its axis, the gear 20 is driven to rotate the gear 18 through the gear 21.

By virtue of the above location of the DC motor 16, the throttle chamber device 5 is minimized in width in the direction of the throttle shaft 12 as compared with that in a case where the motor 16 is located opposite of the gear 21 with respect to the throttle valve.

Additionally, since the throttle chamber device 5 is disposed such that the axis of the throttle chamber 5*a* extends generally along the direction of the row of the cylinders of the V-type engine 1 as discussed above, the width (in the direction of extension of the throttle shaft 12) of the throttle chamber device 5 is in a direction to interfere with the cylinder head and/or the rocker cover of each bank 1*a*, 1*b*. However, as discussed above, a dimensional increase in the direction of the throttle shaft 12 is largely suppressed though the DC motor 16 being provided, and therefore the throttle chamber device 5 can be located generally at the same height position as that in a case where no throttle actuator mechanism 17 is provided. Besides, the DC motor 16 is disposed below the throttle chamber device 5, and accordingly it is unnecessary to raise the height of an engine hood defining the engine compartment.

Furthermore, since the throttle chamber device 5 can obtain its width nearly the same as that in a case of providing no throttle actuator mechanism 17, it is unnecessary to locate the throttle chamber device 5 at a position rearward of the rear end of the engine 1 and out of between the banks 1*a*, 1*b* in order to avoid the interference of the motor 16 with the cylinder head and/or rocker cover without changing the height position of the throttle chamber device 5. This makes an enlargement of the engine compartment unnecessary.

It will be appreciated that a mechanism for transmitting a rotational driving force of the DC motor 16 to the throttle shaft 12 and an acceleration drum mechanism 13 are not limited to those disclosed above, and therefore those may be replaced with other driving mechanisms such as link mechanisms.

While only the V-type engine mounted longitudinally relative to the vehicle body has been shown and described, it will be understood that the principle of the present invention may be applied to a so-called transversely mounted V-type engine.

Although the principle of the present invention is not limited to be applied to the throttle valve device provided with the two-barrel type throttle chamber, it will be appreciated that the present invention is particularly effective for such a throttle valve device as being wider in the direction of throttle shaft 12 of the throttle chamber device 5.

What is claimed is:

1. A throttle valve device of a V-type internal combustion engine of a type wherein an intake manifold is disposed between two banks of the engine, comprising:

a throttle chamber through which intake air is introduced into engine cylinders of the engine, said throttle chamber having an axis generally parallel with rows of the engine cylinders and being located between the two banks of the engine in plan, said throttle chamber being connected through said intake manifold to the engine cylinders;

a throttle valve rotatably disposed in said throttle chamber;

a throttle shaft on which said throttle valve is mounted;

a first throttle valve operating mechanism connected to a first end section of said throttle shaft for rotating said throttle shaft in response to an acceleration operation; and a second throttle valve operating mechanism for rotating said throttle shaft independently of said first throttle valve operating mechanism, said second throttle valve operating mechanism including an electric motor having a rotatable drive shaft, said drive shaft being separate and drivingly connected with a second end section of said throttle shaft, said drive shaft extending parallel with and generally opposite to said throttle shaft, said electric motor being located below said throttle chamber and between the two banks of the engine in plan.

2. A throttle valve device as claimed in claim 1, wherein said first throttle valve operating mechanism includes an acceleration drum operatively connected to the first end section of said throttle shaft to rotate said throttle shaft in response to the acceleration operation.

3. A throttle valve device as claimed in claim 1, wherein said electric motor is arranged to be controlled in response to a vehicle operating parameter.

4. A throttle valve device as claimed in claim 1, wherein said second throttle valve operating mechanism includes a first gear mounted on the second end section of said throttle shaft, and a second gear mounted on an end section of said motor drive shaft, said first gear being drivably connected with said second gear, said first and second gears having respective axes which are parallel with and generally opposite to each other.

5. A throttle valve device as claimed in claim 4, wherein said second throttle valve operating mechanism includes a third gear interposed between and engaged with said first and second gears, said third gear having an axis parallel with the axes of said first and second gears.

6. A throttle valve as claimed in claim 1, wherein said motor is a DC motor.

7. A throttle valve device as claimed in claim 1, wherein said throttle chamber is of a two-barrel type wherein said two barrels are formed, said two barrels having respective axes which are parallel with each other and extend generally parallel with the row of the engine cylinders.

8. A throttle valve device as claimed in claim 7, wherein said throttle valve includes first and second throttle valves which are mounted on said throttle shaft and disposed respectively in said two barrels.

9. A throttle valve device as claimed in claim 1, wherein said drive shaft of said motor is located above the two banks of the engine.

10. A V-type internal combustion engine comprising:

first and second banks each having a plurality of engine cylinders;

an air induction duct through which intake air is inducted, said air induction duct being located on a front side of the engine relative to an axial center of the engine;

a throttle chamber through which intake air is introduced into the engine cylinders of the engine, said throttle chamber having an axis generally parallel with rows of the engine cylinders and being located between the first and second banks of the engine in plan, said throttle chamber being located on a rear side of the engine relative to the axial center of said engine;

an air intake manifold disposed between the first and second banks to connect said throttle chamber with the engine cylinders;

an air introduction duct connecting said air intake duct and said throttle chamber;

a throttle valve rotatably disposed in said throttle chamber;

a throttle shaft on which said throttle valve is mounted;

a first throttle valve operating mechanism connected to a first end section of said throttle shaft for rotating said throttle shaft in response to an acceleration operation; and a second throttle valve operating mechanism for rotating said throttle shaft independently of said first throttle valve operating mechanism, said second throttle valve operating mechanism including an electric motor having a rotatable drive shaft, said drive shaft being separate and drivingly connected with a second end section of said throttle shaft, said drive shaft extending parallel with and generally opposite to said throttle shaft, said electric motor being located below said throttle chamber and between the first and second banks of the engine in plan, wherein said throttle chamber is connected through said intake manifold to the engine cylinders.

11. A V-type internal combustion engine as claimed in claim 9, wherein said engine is longitudinally mounted relative to a vehicle body so that a lengthwise axis of the engine is parallel with that of the vehicle body.

12. A throttle valve device as claimed in claim 1, wherein said electric motor is located such that a drive shaft of the electric motor traverses a vertical plane which extends along the rows of the engine cylinders, and wherein the electric motor is located at a central position between the two banks of the engine.

13. A V-type internal combustion engine comprising:

first and second banks each having a plurality of engine cylinders;

an intake manifold disposed between said first and second banks;

a throttle chamber through which intake air is introduced into the engine cylinders, said throttle chamber having an axis generally parallel with rows of the engine cylinders and being located between the first and second banks of the engine in plan, said throttle chamber being connected through said intake manifold to the engine cylinders;

a throttle valve rotatably disposed in said throttle chamber;

a throttle shaft on which said throttle valve is mounted;

a first throttle valve operating mechanism connected to a first end section of said throttle shaft for rotating said throttle shaft in response to an acceleration operation;

a second throttle valve operating mechanism for rotating said throttle shaft independently of said first throttle valve operating mechanism, said second throttle valve operating mechanism including an electric motor having a rotatable drive shaft, said drive shaft being separate and drivingly connected with a second end section of said throttle shaft, said drive shaft extending parallel with and generally opposite to said throttle shaft, wherein said electric motor is located below said throttle chamber and between the first and second banks of the engine in plan.

14. A throttle valve device as claimed in claim 12, wherein the axis of said throttle chamber that is generally parallel with the rows of the engine cylinders is defined by a lengthwise direction of the throttle shaft.

* * * * *